May 16, 1950     H. NEUWIRTH     2,508,039
TRIPOD LEG
Filed Aug. 5, 1947
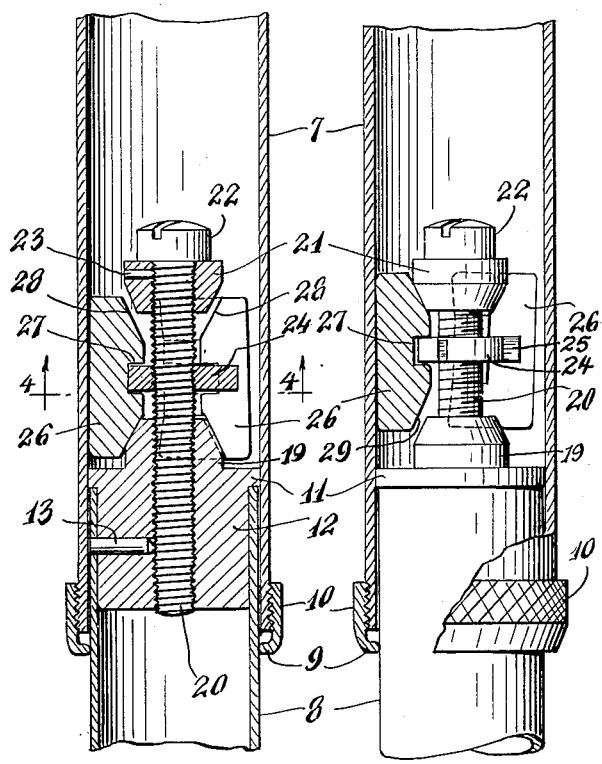
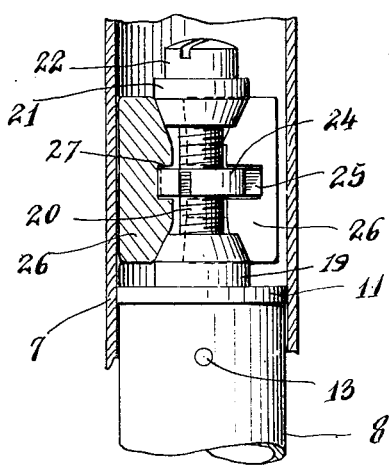
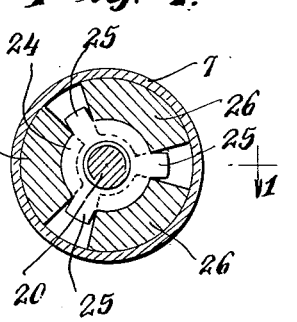
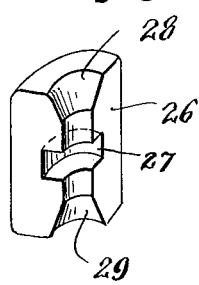
INVENTOR.
H. Neuwirth
BY John A. Seifert
ATTORNEY Patented May 16, 1950

2,508,039

UNITED STATES PATENT OFFICE 2,508,039

TRIPOD LEG

Herman Neuwirth, Brooklyn, N. Y.

Application August 5, 1947, Serial No. 766,135

4 Claims. (Cl. 248—191)

This invention relates to tripod legs adjustably connected to a base or head for supporting a camera or other instrument and consisting of tubular telescoping sections adapted to be adjusted longitudinally of each other to provide legs of different lengths for varying the height at which the supporting base or head is to be positioned, and particularly to means to secure or lock the leg sections in adjusted position.

It is an object of the invention to provide locking means for tripod legs wherein the locking shoes thereof are positively actuated to locking and unlocking position without the use of springs or a rigid connection between the shoes and their actuating means.

It is another object of the invention to provide locking means actuated to tripod leg locking position by rotating either leg section in either direction.

It is a further object of the invention to provide locking means for tripod legs requiring a less number of parts than the locking means now in commercial use.

Other objects and advantages of the invention will be hereinafter described.

In the drawing accompanying and forming a part of this application,

Figure 1 is a fragmentary longitudinal sectional view of tripod leg sections taken substantially on the line 1—1 of Figure 4 looking in the direction of the arrows and showing locking means adjusted to one of the tripod leg locking positions.

Figure 2 is a view similar to Figure 1 showing the locking means adjusted to the other tripod leg locking position.

Figure 3 is a view similar to Figures 1 and 2 showing the locking means adjusted to unlocking position to permit adjusting of the tripod leg sections longitudinally of each other.

Figure 4 is a cross sectional view taken on the line 4—4 of Figure 1 looking in the direction of the arrows.

Figure 5 is a perspective view of a shoe of the locking means.

In carrying out the invention as illustrated in the accompanying drawing, there is provided telescoping tubular leg sections 7 and 8, the leg section 7 being of larger diameter than the leg section 8. The longitudinal adjustment of the leg section 8 outwardly from the leg section 7 is limited by an inwardly flanged end 9 of a collar 10 screw threaded on the lower end of the leg section 7. The diameter of the opening formed by the flange 9 is substantially the same as the outer diameter of the leg section 8, which is slightly less than the inner diameter of the leg section 7. The flange 9 engages a shoulder 11 of a plug 12 engaged in the inner end of the leg section 8 and secured therein by a pin 13 engaged in the leg section 8 and plug 12. The diameter of the plug flange 11 is slightly less than the inner diameter of the leg section 7, but greater than the outer diameter of the leg section 8, as shown in Figure 4, so that the plug flange 11 will abut the collar flange 9 in the extreme extended position of the leg section 8. The upper ends of the leg sections 7 are adjustably connected to a base or head in any suitable well known manner to permit axial rotation of the leg sections.

The means for releasably locking the leg sections 7 and 8 in adjusted position is carried by the plug 12 to extend into the leg section 7. The outer end of the plug 12 is arranged with a conical head 19 integral with and extending axially therefrom and constituting one of the members to expand the locking members or shoes to be hereinafter described. A screw threaded stem 20 is engaged in a bore extending axially through the plug 12 and head 19 and secured in said plug by the pin 13, as shown in Figure 1. The stem 20 extends from the head 19 into the leg section 7 and the outer end is provided with a conical head 21 corresponding in shape to and positioned in opposing relation to the head 19, and shown in the present illustration of the invention as being in the form of a collar engaged on the stem in abutting relation to a head 22 of the stem and secured in said position by a pin 23 engaged in the collar head 21 with the inner end abutting the stem, as shown in Figure 1. The head 21 constitutes the other member to expand the locking members or shoes.

An adjustable member is mounted on the projecting portion of the stem 20 between the heads 19 and 21 and comprises a disk 24 screw threaded on said projecting portion of the stem 20 and having projections 25 equidistantly spaced around the periphery of the disk.

The leg sections 7 and 8 are locked in adjusted position by locking members carried by the adjustable member 24 and comprising a plurality of shoes 26 of arcuate shape in cross section and of a length substantially equal to the distance between the base of the conical portions of the heads 19 and 21. The side walls of the shoes 26 are tapered from the outer to the inner arcuate faces of the shoes at an angle corresponding to the sides of the projections 25 of the disk 24, as shown in Figures 4 and 5. The thickness of the shoes 26 is greater than the space between the periphery of the disk 24 and the leg section 7, and to compensate for this difference and mount the shoes 26 on the disk 24, a recess 27 is provided in each shoe midway of the ends of the shoe and extended inwardly from the inner arcuate face thereof to engage the peripheral portion of the disk 24 between the projections 25. The projections 25 engaging the sides of the shoes impart rotation of the disk 24 to the shoes 26 or the sides of the shoes engaging the projections 25 impart rotation of the shoes to the disk 24. The shoes 26 will participate in the movement of the disk 24 longitudinally of the stem 20 through the engagement of the disk in the recesses 27. The opposite end portions of the inner arcuate faces of the shoes 26 are flared, as at 28 and 29, at an angle corresponding to the heads 19 and 21, so that the rotation of either of the leg sections 7 and 8 in opposite directions will move the flaring end portions 28 along the conical portion of the head 21 and expand the upper ends of the outer arcuate faces of the shoes into locking engagement with the leg section 7, as shown in Figure 2, and the rotation of either of the leg sections 7 and 8 in the other opposite directions will move the flaring end portions 29 along the conical portion of the head 19 and expand the lower ends of the outer arcuate faces of the shoes into locking engagement with the leg section 7, as shown in Figure 1.

To adjust the shoes 26 to the position shown in Figure 1, either the leg section 7 is rotated in a clockwise direction looking at the upper end of said leg section whereby the clockwise rotation of the leg section 7 is imparted to the shoes 26 to move the disk 24 and shoes longitudinally of the stem 20 toward the head 19, or the leg section 8 is rotated in a counter-clockwise direction looking at the inner end of said leg section 8 which will rotate the stem 20 in said counter-clockwise direction and move the disk 24 and shoes 26 longitudinally of the stem toward the head 19.

To adjust the shoes 26 to the position shown in Figure 2, either the leg section 7 is rotated in a counter-clockwise direction looking at the upper end of said leg section 7 which will rotate the shoes 26 and disk 24 in said counter-clockwise direction and move the disk 24 and shoes 26 longitudinally of the stem 20 toward the head 21, or the leg section 8 is rotated in a clockwise direction looking at the inner end thereof which will rotate the stem 20 in the same clockwise direction and move the disk 24 and shoes 26 toward the head 21.

When it is desired to release the leg sections 7 and 8 from locked position and permit longitudinal adjustment of said leg sections, the disk 24 is adjusted by any of the described methods to position said disk on the stem 20 midway of the heads 19 and 21 and the flaring end portions 28 and 29 of the shoes in equal engagement with the conical portions of the heads 21 and 19, respectively, as shown in Figure 3. When the shoes 26 are adjusted to the unlock position shown in Figure 3, the outer arcuate faces of the shoes are in frictional engagemnt with the leg section 7, so that the rotation of either leg section 7 or 8 will actuate the disk 24 and shoes 26 longitudinally of the stem 20 in the desired direction, but said frictional engagement will not be sufficient to lock the leg sections against longitudinal or telescoping adjustment.

In the present illustration of the invention, three projections 25 of the disk 24 and three shoes 26 are shown, but the number of projections and shoes may be increased or decreased without affecting the operations thereof.

Having thus described my invention, I claim:

1. In a tripod leg including telescoping tubular sections, means for releasably locking the leg sections against telescoping movement, comprising a stem extended from the inner end of the inner leg section into the outer leg section and arranged with conical heads at the opposite ends, and laterally expansible and contractible shoes adjustably coupled to the stem and longitudinally adjustable on the stem by the rotation of either leg section in opposite directions and having an arcuate flaring face at the opposite ends to move along the conical heads of the stem in either direction of longitudinal adjustment of the shoes on the stem and expand the shoes into and retain them in frictional locking engagement with the outer leg section, and adjustment of the shoes on the stem with the flaring faces in equal engagement with the conical heads positioning the shoes out of locking engagement with the outer leg section and releasing the leg sections to have telescoping adjustment.

2. In a tripod leg including telescoping tubular sections, means for releasably locking the leg sections against telescoping movement, comprising a screw threaded stem extending from the inner end of the inner leg section into the outer leg section and arranged with conical heads at the opposite ends, a member having threaded engagement with the stem for longitudinal adjustment on said stem, and laterally expansible and contractible shoes carried by the member to frictionally engage the outer leg section and having an arcuate flaring face at the opposite ends to move along the conical heads of the stem by the longitudinal adjustment of the adjustable member in either direction imparted thereto by the rotation of either leg section and expand the shoes into and retain them in frictional locking engagement with the outer leg section, and adjustment of the adjustable member on the stem to position the flaring faces in equal engagement with the conical heads positioning the shoes out of locking engagement with the outer leg section and releasing the leg sections to have telescoping adjustment.

3. A tripod leg as claimed in claim 2, wherein the adjustable member comprises a disk having projections equidistantly spaced around the periphery thereof, and the shoes are arranged with a recess intermediate the ends thereof to engage the disk between the projections.

4. In a tripod leg including telescoping tubular sections, means for releasably locking the leg sections against telescoping movement, comprising a plug secured in the inner end of the inner leg section and having a conical head extending from said inner end of the inner leg section into the outer leg section, a screw threaded stem mounted in the plug and extending from the apex of the conical head of the plug into the outer leg section and having a conical head at the free end in opposed relation to the conical head of the plug, a member having threaded engagement with the stem for longitudinal adjustment on the stem, and laterally expansible and contractible shoes of arcuate shape in cross section loosely mounted at the center on the adjustable member to frictionally engage the outer leg section and having a flaring face at the opposite ends to move along the conical heads of the plug and stem by the longitudinal adjustment of the adjustable member in either direction imparted thereto by the rotation of either leg section and expand the shoes into and retain them in frictional locking engagement with the outer leg section, and adjustment of the adjustable member on the stem to a position midway between the heads positioning the shoes out of locking engagement with the outer leg section and releasing the leg sections to have telescoping movement.

HERMAN NEUWIRTH.

REFERENCES CITED

The following references are of record in the file of this patent:

UNITED STATES PATENTS

| Number | Name | Date |
|---|---|---|
| 2,291,748 | Neuwirth | Aug. 2, 1942 |

FOREIGN PATENTS

| Number | Country | Date |
|---|---|---|
| 530,320 | Germany | July 27, 1931 |
| 718,486 | France | Jan. 25, 1932 |
| 562,064 | Germany | Oct. 21, 1932 |